United States Patent
Su et al.

(10) Patent No.: US 10,028,157 B2
(45) Date of Patent: Jul. 17, 2018

(54) DEVICE AND METHOD FOR HANDLING BIT ALLOCATION

(71) Applicant: MStar Semiconductor, Inc., Hsinchu Hsien (TW)

(72) Inventors: Yu-Che Su, Zhubei (TW); Tai-Lai Tung, Zhubei (TW)

(73) Assignee: MSTAR SEMICONDUCTOR, INC., Hsinchu Hsien (TW)

(*) Notice: Subject to any disclaimer, the term of this patent is extended or adjusted under 35 U.S.C. 154(b) by 142 days.

(21) Appl. No.: 15/016,406

(22) Filed: Feb. 5, 2016

(65) Prior Publication Data
US 2017/0188247 A1    Jun. 29, 2017

(30) Foreign Application Priority Data
Dec. 24, 2015  (TW) .............................. 104143511 A

(51) Int. Cl.
| | |
|---|---|
| H04L 12/26 | (2006.01) |
| H04W 24/08 | (2009.01) |
| H04W 72/08 | (2009.01) |
| H04L 5/00 | (2006.01) |

(52) U.S. Cl.
CPC ............. H04W 24/08 (2013.01); H04L 5/006 (2013.01); H04W 72/085 (2013.01)

(58) Field of Classification Search
None
See application file for complete search history.

(56) References Cited

U.S. PATENT DOCUMENTS

| | | | | |
|---|---|---|---|---|
| 9,674,005 | B1* | 6/2017 | Wu | H04L 25/025 |
| 9,825,666 | B2* | 11/2017 | Moreno | H04B 3/32 |
| 2003/0179770 | A1* | 9/2003 | Reznic | H04L 1/0001 370/442 |
| 2004/0213293 | A1* | 10/2004 | Basso | H04L 5/14 370/480 |
| 2005/0018784 | A1* | 1/2005 | Kurobe | H04L 1/0003 375/260 |
| 2006/0165189 | A1* | 7/2006 | Tamaki | H04L 1/0003 375/260 |
| 2007/0258366 | A1* | 11/2007 | Imamura | H04L 5/006 370/230 |
| 2011/0222483 | A1* | 9/2011 | Yuda | H04B 7/063 370/329 |
| 2011/0293031 | A1* | 12/2011 | Zhang | H04L 5/0007 375/268 |
| 2017/0237536 | A1* | 8/2017 | Kim | H04L 5/0046 |

FOREIGN PATENT DOCUMENTS

CN    101304298 A    11/2008

* cited by examiner

*Primary Examiner* — Michael J Moore, Jr.
(74) *Attorney, Agent, or Firm* — Edell, Shapiro & Finnan, LLC

(57) ABSTRACT

A bit allocation device includes: a channel estimation unit, performing a channel estimation to generate a plurality of channel qualities of a plurality of subcarriers; a processing unit, coupled to the channel estimation unit, generating a first plurality of bit numbers of the plurality of subcarriers according to the plurality of channel qualities; and a control unit, coupled to the processing unit, generating a second plurality of bit numbers of the plurality of subcarriers according to the first plurality of bit numbers and an upper limit of a total bit number.

18 Claims, 6 Drawing Sheets

US 10,028,157 B2

DEVICE AND METHOD FOR HANDLING BIT ALLOCATION

This application claims the benefit of Taiwan application Serial No. 104143511, filed Dec. 24, 2015, the subject matter of which is incorporated herein by reference.

BACKGROUND OF THE INVENTION

Field of the Invention

The invention relates in general to a device and method for a communication system, and more particularly to a device and method for handling bit allocation.

Description of the Related Art

Orthogonal frequency-division multiplexing (OFDM) (or referred to as discrete multi-tone modulation (DMT)) technologies have high spectrum utilization efficiency and strong attenuation resistance capabilities. Thus, many modern high-speed communication systems adopt OFDM technologies to transmit and receive signals, in order to increase the probability of correctly recovering the signals. In OFDM technologies, various numbers of bits can be allocated to individual subcarriers to thoroughly use the capacity of channels. Bit allocation of the subcarriers may be recorded in a tonemap. In general, the tonemap includes carrier-dependent information, such as the bit numbers carried by the individual subcarriers of OFDM signals, and so a communication device can transmit/receive bits on these subcarriers according to the tonemap.

A communication device may determine the bit number of a subcarrier according to the channel quality, i.e., calculating the bit allocation of the subcarrier according to the channel quality. However, in actual operations of a communication system, the communication device may be incapable of transmitting or receiving signals according to the bit allocation that is determined by the above method. For example, a communication service provider may be restrained from transmitting OFDM signals, or the number of physical blocks (PB) included in OFDM symbols is limited. Under such circumstances, the communication device needs to modify the original bit allocation, so as to transmit or receive OFDM signals while meeting the limitation.

The bit allocation that is determined according to the channel quality usually causes the communication device to have optimal performance, such as highest throughput, and arbitrarily modifying the bit allocation may cause performance degradation. Therefore, there is a need for a solution that modifies the bit allocation while meeting limitations and reducing the impact on the performance.

SUMMARY OF THE INVENTION

The invention is directed to a bit allocation device and method for handling bit numbers in a tonemap to solve the foregoing issues.

The present invention discloses a bit allocation device. The bit allocation device includes: a channel estimation unit, performing a channel estimation to generate a plurality of channel qualities of a plurality of subcarriers; a processing unit, coupled to the channel estimation unit, generating a first plurality of bit numbers of the plurality of subcarriers according to the plurality of channel qualities; and a control unit, coupled to the processing unit, generating a second plurality of bit numbers of the plurality of subcarriers according to the first plurality of bit numbers and an upper limit of a total bit number.

The present invention further discloses a bit allocation method. The bit allocation method includes: performing a channel estimation by a channel estimation unit to generate a plurality of channel qualities of a plurality of subcarriers; generating a first plurality of bit numbers of the plurality of subcarriers according to the plurality of channel qualities by a processing unit; and generating a second plurality of bit numbers of the plurality of subcarriers according to the first plurality of bit numbers and an upper limit of a total bit number by a control unit.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
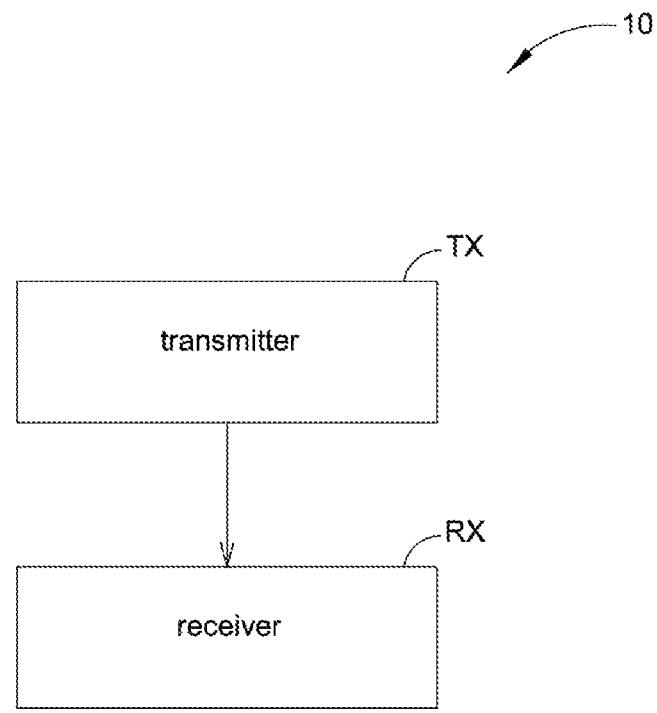
FIG. 1 is a schematic diagram of a communication system according to an embodiment of the present invention.

FIG. 1 shows a schematic diagram of a communication system 10 according to an embodiment of the present invention. For example, the communication system 10 may be a communication system based on orthogonal frequency-division multiplexing (OFDM) (or referred to as discrete multi-tone modulation (DMT)) technologies, and is mainly formed by a transmitter TX and a receiver RX. In FIG. 1, the transmitter TX and the receiver RX are utilized to illustrate the architecture of the communication system 10. For example, the communication system 10 may be wired communication system such as an asymmetric digital subscriber line (ADSL) system, a power line communication (PLC) system or an Ethernet over coax (EOC) system, or a wireless communication system such as a wireless local area network (WLAN), a Digital Video Broadcasting (DVB) system or a Long Term Evolution-Advanced (LTE-A) system. The DVB system may include a DVB-Terrestrial (DVT-T) and a DVB Second Generation Terrestrial (DVB-T2) system. Further, for example but not limited to, the transmitter TX and the receiver RX may be disposed in a mobile phone, a laptop computer, a tablet computer, an e-book or a portable computer system.

Figure 2:
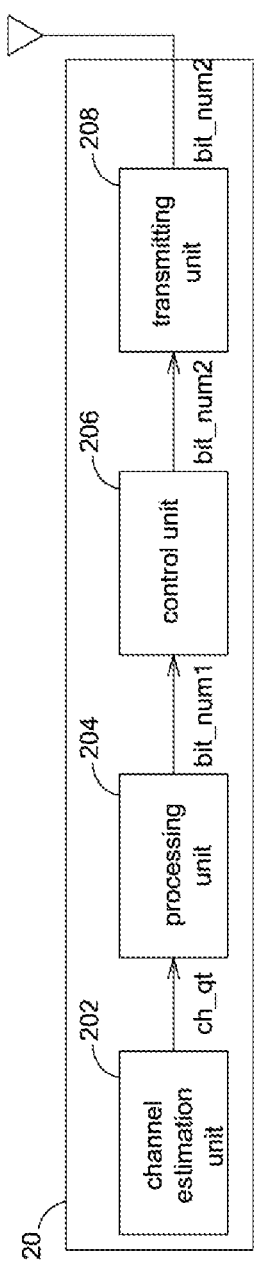
FIG. 2 is a schematic diagram of a bit allocation device according to an embodiment of the present invention.

FIG. 2 shows a schematic diagram of a bit allocation device 20 according to an embodiment of the present invention. The bit allocation device 20 is applied in the transmitter TX in FIG. 1, and is used for handling allocation of bit numbers of subcarriers in a tonemap. The bit allocation device 20 includes a channel estimation unit 202, a processing unit 204, a control unit 206 and a transmitting unit 208. More specifically, the channel estimation unit 202 performs a channel estimation to generate a plurality of channel qualities ch_qt of a plurality of subcarriers. The processing unit 204, coupled to the channel estimation unit 202, generates a first plurality of bit numbers bit_num1 of the subcarriers according to the channel qualities ch_qt. The control unit 206, coupled to the processing unit 204, generates a second plurality of bit numbers bit_num2 of the subcarriers according to the first bit numbers bit_num1 and an upper limit of a total bit number. For example, the upper limit of the total bit number may be a limitation resulted from the number of physical blocks (PB) specified by the communication standard, or may be a limitation resulted from rules defined by a communication service provider. The transmitting unit 208, coupled to the control unit 206, transmits the second bit numbers bit_num2 to a communication device.

It should be noted that, in FIG. 2, being placed at the transmitter TX as an example, the bit allocation device 20 may further include the transmitting unit 208. In addition to updating the tonemap according to the second bit numbers bit_num2, the transmitter TX may also transmit the tonemap including the second bit numbers bit_num2 to another communication device (e.g., the receiver RX) for that communication device to update the tonemap, such that the two ends may communicate using the same tonemap. When the bit allocation device 20 is placed in the receiver RX, as the receiver RX need not transmit the second bit numbers bit_num2, the bit allocation device 20 may exclude the transmitting unit 208. Further, there are numerous parameters for expressing the channel qualities ch_qt. For example, the channel qualities ch_qt may include a plurality of signal-to-noise ratios (SNRs) of the subcarriers.

There are numerous ways for the processing unit 204 to generate the first bit numbers bit_num1. For example, the processing unit 204 may generate the first bit numbers bit_num1 according to the channel qualities ch_qt and a target bit error rate (BER).

Figure 3:
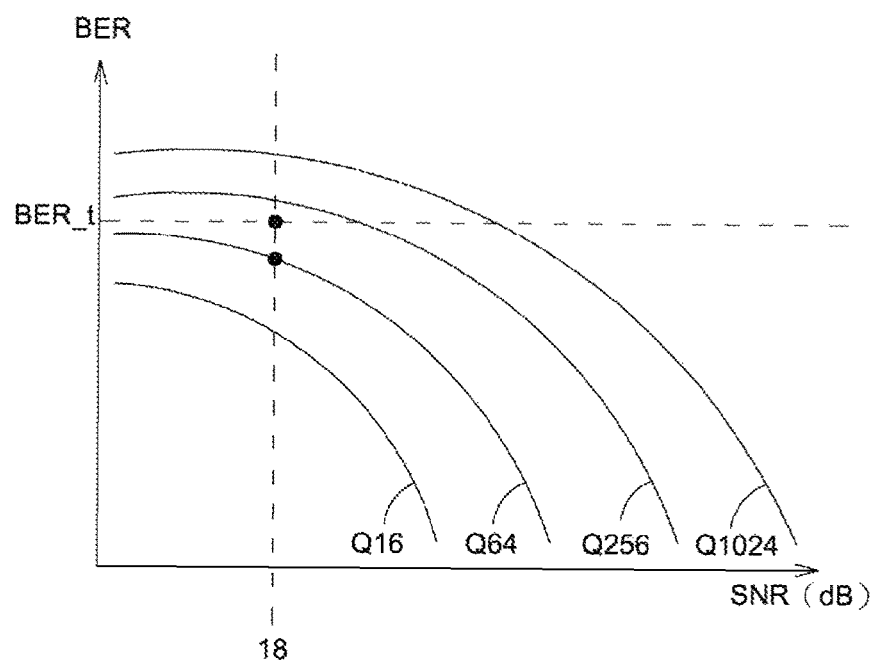
FIG. 3 is a schematic diagram of a corresponding relationship of a signal-to-noise ratio (SNR), a target bit error rate (BER) and a bit number according to an embodiment of the present invention.

FIG. 3 shows a schematic diagram of a corresponding relationship of the SNR, the target BER and bit numbers according to an embodiment of the present invention. FIG. 3 is used for explaining how the processing unit 204 generates a bit number of a subcarrier according to the SNR and the target BER. In FIG. 3, the vertical axis and the horizontal axis represent the BER and the SNR, respectively. FIG. 3 depicts four curves, which are, from left to right, BER curves of 16 quadrature amplitude modulation (QAM), 64QAM, 256QAM and 1024QAM denoted as Q16, Q64, Q256 and Q1024, respectively, for transmitting 4, 6, 8 and 10 bits, respectively. Each of the curves represents the BER corresponding to the SNR of respective signals. FIG. 3 further depicts the target BER BER_t, which indicates a BER that the signals transmitted through the subcarrier are expected to satisfy. In the embodiment, it is assumed that the SNR of a subcarrier estimated by the channel estimation unit 202 is 18 dB. Thus, it is known based on the target BER BER_t and the SNR that, when the BER is expected to be lower than the target BER BER_t, in order to transmit a maximum number of bits on the subcarrier, the processing unit 204 selects 64QAM Q64, i.e., the bit number of the subcarrier (used for transmitting) is 6. Details for obtaining the bit numbers of each of a plurality of subcarriers may be similarly deduced, and shall be omitted herein. In practice, a look-up table (LUT) may be utilized to represent the curves in FIG. 3, so as to allow the processing unit 204 to convert the channel qualities ch_qt that the channel estimation unit 202 generates to the corresponding first bit numbers bit_num1 according to the target BER BER_t.

There are numerous ways for the control unit 206 to generate the second bit numbers bit_num2. For example, the processing unit 206 may generate a plurality of BER differences according to a first plurality of BERs of the first plurality of bit numbers bit_num1 and a target BER. The processing unit 206 generates the second bit numbers bit_num2 according to the first bit numbers bit_num1, the BER differences and the upper limit of the total bit number. Several exemplary approaches for generating the second bit numbers bit_num2 are given below.

In one embodiment, when the total number of the first bit numbers bit_num1 is greater than the upper limit of the total bit number, the control unit 206 may sequentially decrease a set of bit numbers of a set of subcarriers of a plurality of subcarriers according to a decreasing order of the BER differences and the upper limit of the total bit number to generate the second bit numbers bit_num2. That is to say, when the bit number calculated according to the channel quality exceeds the upper limit of the total bit number, the bit allocation device 20 may decrease the number of bits to be transmitted according to the BER difference to satisfy the limitation of the upper limit of the total bit number. In another embodiment, when the total number of the first bit numbers bit_num1 is smaller than the upper limit of the total bit number, the control unit 206 may sequentially increase a set of bit numbers of a set of subcarriers of a plurality of subcarriers according to an increasing order of the BER differences and the upper limit of the total bit number to generate the second bit numbers bit_num2. That is to say, when the total number of bit number calculated according to the channel quality does not exceed the upper limit of the total bit number, the bit allocation device 20 may increase the number of bits to be transmitted according to the BER difference to increase the throughput.

Figure 4:
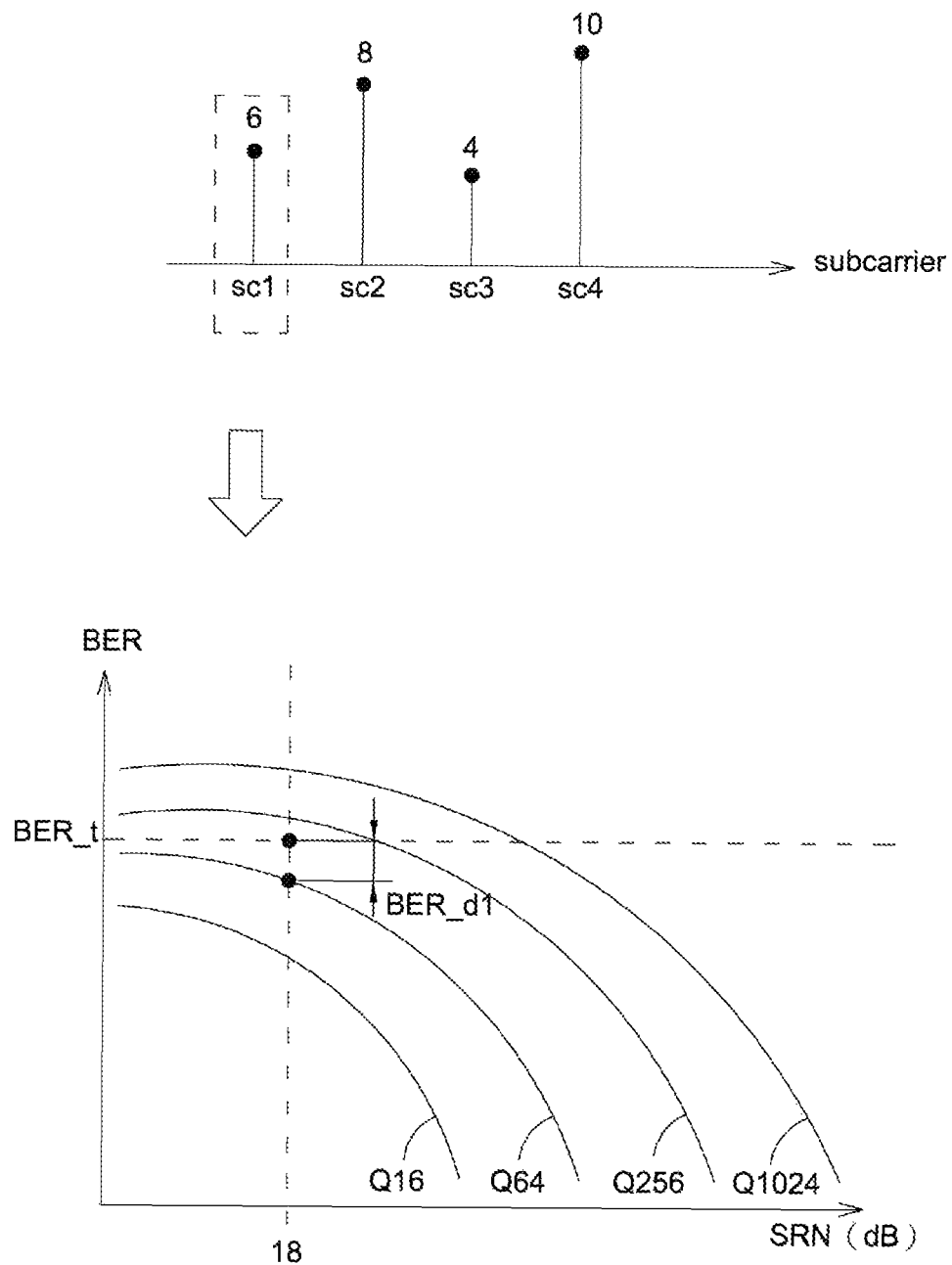
FIG. 4 is a schematic diagram of adjusting bit numbers according to BER differences of subcarriers according to an embodiment of the present invention.

FIG. 4 shows a schematic diagram of adjusting the bit numbers according to BER differences of subcarriers according to an embodiment of the present invention. In FIG. 4, four subcarriers sc1 to sc4 are used to illustrate how the processing unit 204 generates bit numbers of the subcarriers according to BER differences of the subcarriers. In practice, the embodiment can be applied to various number of subcarriers of various bit numbers, and the scope of the present invention is not limited to the exemplary number in this embodiment. FIG. 4 further depicts a schematic diagram of the corresponding relationship of the SNR, the target BER and the bit numbers according to FIG. 3 to describe how to calculate a BER difference of a subcarrier. According to the present invention, the processing unit 204 may calculate that the bit numbers of the subcarriers sc1 to sc4 are 6, 8, 4 and 10, respectively, according to the channel qualities (e.g., the SNR) of the subcarriers sc1 to sc4. Thus, the total bit number is 28. The control unit 206 then calculates the BER differences BER_d1 to BER_d4 of the subcarriers sc1 to sc4. The BER differences BER_d1 to BER_d4 are respectively differences between the BERs of the 6, 8, 4 and 10 bits and the target BER. Taking the subcarrier sc1 for example, when the channel estimation unit 202 estimates the SNR of the subcarrier sc1 as 18 dB, the processing unit 204 may obtain that the modulation of the subcarrier sc1 is 64QAM Q64 according to the target BER BER_t, i.e., the subcarrier sc1 may be used to transmit 6 bits. Thus, the control unit 206 may calculate and obtain that the BER difference of the subcarrier sc1 is BER_d1. Similarly, the control unit 206 may calculate and obtain that the BER differences of the subcarriers sc2, sc3 and sc4 are BER_d2, BER_d3 and BER_d4, respectively.

After having calculated the BER differences BER_d1 to BER_d4, an order of the values of the BER differences may be obtained through comparison, e.g., BER_d2>BER_d4>BER_d1>BER_d3. In the above situation, according to the value of the upper limit of the total bit number, the control unit 206 may adjust the bit numbers of the subcarriers sc1 to sc4. In one embodiment, assuming that the upper limit of the total bit number is 24 bits, for the original total bit number of 28 bits, the control unit 206 may sequentially decrease the bit numbers of the subcarriers sc2 and sc4 by 2 bits according to a decreasing order of the BER differences, i.e., changing the modulation to 64QAM and 256QAM, respectively. The adjusted bit numbers of the subcarriers sc1~sc4 are 6, 6, 4 and 8 bits, respectively, with the total bit number then being 24 bits such that the limitation of total bit numbers of 24 is met. In another embodiment, assuming that the upper limit of the total bit number is 34 bits, for the original total bit number of 28 bits, the control unit 206 may sequentially increases the bit numbers of the subcarriers sc3, sc1 and sc4 by 2 bits according to a increasing order of the BER differences, i.e., changing the modulation to 64QAM, 256QAM and 4096QAM, respectively. The adjusted bit numbers of the subcarriers are 8, 8, 6 and 12 bits, respectively, with the total bit number then being 34 bits. Therefore, not only the limitation of the total bit number of 34 bits is satisfied, but also the throughput is increased.

It should be noted that, in the above embodiment, the levels of the QAM is changed to adjust the bit numbers, and so the unit for adjusting the bit numbers is 2 bits. When the modulation method is different or when bit numbers are not adjusted by entirely changing the modulation method, the unit may be other bit numbers.

To reduce the complexity, the design of the bit allocation device 20 may consider only one of the above conditions. For example, only the condition where the total bit number of the first bit numbers bit_num1 is smaller than the upper limit of the total bit number, or the condition where the total bit number of the first bit numbers bit_num1 is greater than the upper limit of the total bit number is considered. In one embodiment, if the bit allocation device 20 is designed to process a condition where the total number of the first bit numbers bit_num1 is smaller than the upper limit of the total bit number, when the condition where the total number of the first bit numbers bit_num1 is greater than the upper limit of the total bit number takes place, the bit allocation device 20 may first decrease the bit numbers of a plurality of subcarriers, e.g., reducing the modulation level of the subcarriers, such that the total number of the bit numbers is smaller than the upper limit of the total bit number. The bit numbers are then increased according to the foregoing method to increase the throughput. In another embodiment, if the design of the bit allocation device 20 is for processing a condition where the total number of first bit numbers bit_num1 is greater than the upper limit of the total bit number, when a condition where the total number of first bit numbers bit_num1 is smaller than the upper limit of the total bit number takes place, the bit allocation device 20 may first increase the bit numbers of a plurality of subcarriers, e.g., increasing the modulation level of the subcarriers, such that the total number of the bit numbers is greater than the upper limit of the total bit number. The bit numbers are then reduced according to the foregoing method to satisfy the limitation of the upper limit of the total bit number. As such, the bit allocation device 20 only requires one type of allocation (e.g., one set of circuit) for adequately processing a condition where the total number of the first bit numbers bit_num1 is greater than or smaller than the upper limit of the total bit number, thereby reducing the complexity as well as power consumption of the bit allocation device 20.

Preferably, an average BER of the adjusted bit numbers in the above embodiment is expectantly smaller than the target BER, so as to prevent a higher BER from causing frequent repeated transmission and hence from reducing the throughput. More specifically, considering N subcarriers, if the adjusted bit numbers (i.e., the second plurality of bit numbers bit_num2) are $C_n$, where n=1, ... and N, the respective corresponding BERs are $BER_n$, where n=1, ... and N, and the target BER is $BER_T$. The average BER $\overline{BER}$ should satisfy an equation:

$$\overline{BER} = \frac{\sum_{n=1}^{N} BER_n C_n}{\sum_{n=1}^{N} C_n} < BER_t$$

The time or condition according to which the channel estimation unit 202 performs the channel estimation are not limited. In one embodiment, the channel estimation unit 202 may perform the channel estimation when it determines that a plurality of channel qualities of a plurality of subcarriers are changed. That is to say, when the channel estimation unit 202 determines that the previously estimated channel quality is no longer suitable, it performs channel estimation. In another embodiment, the channel estimation unit 202 may perform the channel estimation when a period in which the channel estimation is not performed exceeds a predetermined value. That is to say, a time interval between two consecutive channel estimations performed by the channel estimation unit 202 is smaller than the predetermined value.

Figure 5:
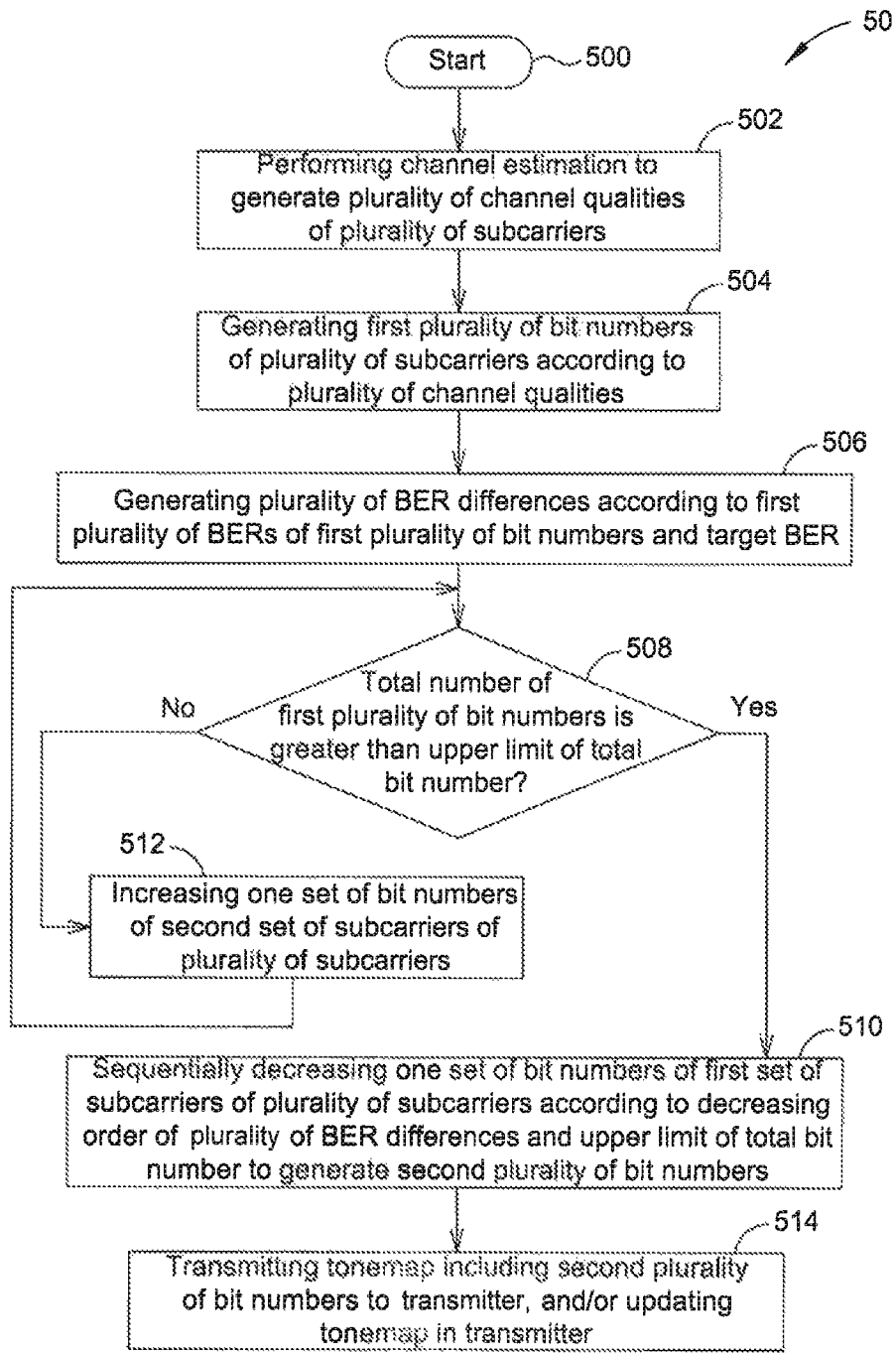
FIG. 5 is a flowchart of a process according to an embodiment of the present invention.

In the embodiment where the total number of the first plurality of bit numbers bit_num1 is greater than the upper limit of the total bit number, the operations of the low-complexity bit allocation device 20 may be concluded into a process 50 that is applied to a transmitter TX. As shown in FIG. 5, the process 50 includes following steps.

In step 500, the process 50 begins.

In step 502, a channel estimation is performed to generate a plurality of channel qualities of a plurality of subcarriers.

In step 504, a plurality of bit numbers of the subcarriers are generated according to the channel qualities.

In step 506, a plurality of BER differences are generated according to a first plurality of BERs of the first bit numbers and a target BER.

In step 508, it is determined whether a total number of the first bit numbers is greater than an upper limit of the total bit number. Step 510 is performed if so, or else step S512 is performed.

In step 510, a set of bit numbers of a first set of subcarriers of the plurality of subcarriers are sequentially decreased according to a decreasing order of the BER differences and the upper limit of the total bit number to generate a plurality of second bit numbers.

In step 512, a set of bit numbers of a second set of subcarriers of the plurality of subcarriers are increased, followed by performing step 508.

In step 514, a tonemap including the second bit numbers is transmitted to a receiver, and/or a tonemap in the transmitter is updated.

The process 50 is an example for explaining operations of the bit allocation device 20. Associated details and variations may be referred from foregoing descriptions, and shall be omitted herein.

Figure 6:
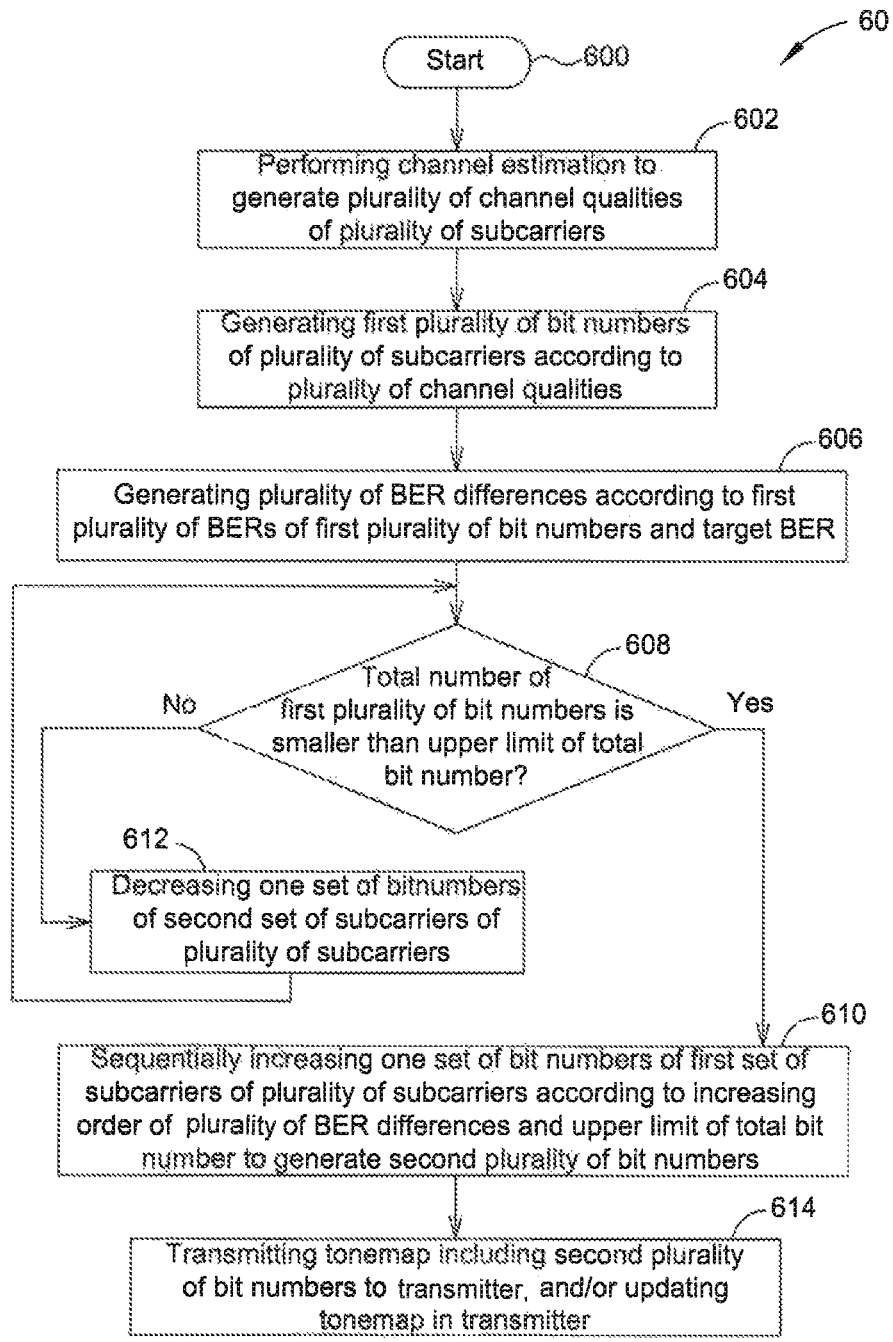
FIG. 6 is a flowchart of a process according to another embodiment of the present invention.

In the embodiment where the total number of the first bit numbers bit_num1 is smaller than the upper limit of the total bit number, operations of the low-complexity bit allocation device 20 may be concluded into a process 60 that is applied to a transmitter TX. As shown in FIG. 6, the process 60 includes following steps.

In step 600, the process 60 begins.

In step 602, a channel estimation is performed to generate a plurality of channel qualities of a plurality of subcarriers.

In step 604, a plurality of bit numbers of the subcarriers are generated according to the channel qualities.

In step 606, a plurality of BER differences are generated according to a first plurality of BERs of the first bit numbers and a target BER.

In step 608, it is determined whether a total number of the first bit numbers is smaller than an upper limit of the total bit number. Step 610 is performed if so, or else step S612 is performed.

In step 610, a set of bit numbers of a first set of subcarriers of the plurality of subcarriers are sequentially increased according to an increasing order of the BER differences and the upper limit of the total bit number to generate a plurality of second bit numbers.

In step 612, a set of bit numbers of a second set of subcarriers of the plurality of subcarriers are decreased, followed by performing step 608.

In step 614, a tonemap including the second bit numbers is transmitted to a receiver, and/or a tonemap in the transmitter is updated.

The process 60 is an example for explaining operations of the bit allocation device 20. Associated details and variations may be referred from foregoing descriptions, and shall be omitted herein.

It should be noted that, there are numerous ways to implement the bit allocation device 20 (and the channel estimation unit 202, the processing unit 204, the control unit 206 and the transmitting unit 208 therein). For example, the channel estimation unit 202, the processing unit 204, the control unit 206 and the transmitting unit 208 may be integrated into one unit or multiple units according to design considerations or system requirements. Further, for example, the bit allocation device 20 may be realized by any combination of hardware, software, firmware (a combination of a hardware device and computer commands, and the computer commands and data are read-only software on the hardware device), a computer system, and the above devices.

In conclusion, the present invention provides a device and method for handling bit allocation. The device and method adjust the bit allocation in a tonemap according to channel qualities of subcarriers and an upper limit of a total bit number. According to the present invention, the system throughput is increased while the limitation of the upper limit of the total bit number is satisfied also by the total number of the bit numbers.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A bit allocation device, comprising:
a channel estimation circuit, performing a channel estimation to generate a plurality of channel qualities of a plurality of subcarriers;
a processing circuit, coupled to the channel estimation circuit, generating a first plurality of bit numbers of the plurality of subcarriers according to the plurality of channel qualities; and
a control circuit, coupled to the processing circuit, generating a second plurality of bit numbers of the plurality of subcarriers according to the first plurality of bit numbers and an upper limit of a total bit number,
wherein the control circuit is configured to generate a plurality of bit error rate (BER) differences according to a first plurality of BERs of the first plurality of bit numbers and a target BER, and to generate the second plurality of bit numbers according to the first plurality of bit numbers, the plurality of BER differences and the upper limit of the total bit number.

2. The bit allocation device according to claim 1, wherein the processing circuit generates the first plurality of bit numbers according to the plurality of channel qualities and a target bit error rate (BER).

3. The bit allocation device according to claim 1, wherein the control circuit is configured to, when a total number of the first plurality of bit numbers is greater than the upper limit of the total bit number, sequentially decrease a set of bit numbers of a first set of subcarriers of the plurality of subcarriers according to a decreasing order of the plurality of BER differences and the upper limit of the total bit number to generate the second plurality of bit numbers.

4. The bit allocation device according to claim 3, wherein the control circuit is configured to, when the total number of the first plurality of bit numbers is smaller than the upper limit of the total bit number, increase a set of bit numbers of a second set of subcarriers of the plurality of subcarriers to cause the total number of the first plurality of bit numbers to be greater than the upper limit of the total bit number.

5. The bit allocation device according to claim 1, wherein the control circuit is configured to, when a total number of the first plurality of bit numbers is smaller than the upper limit of the total bit number, sequentially increase a set of bit numbers of a first set of subcarriers of the plurality of subcarriers according to an increasing order of the plurality of BER differences and the upper limit of the total bit number to generate the second plurality of bit numbers.

6. The bit allocation device according to claim 5, wherein the control circuit is configured to, when the total number of the first plurality of bit numbers is greater than the upper limit of the total bit number, decrease a set of bit numbers of a second set of subcarriers of the plurality of subcarriers to cause the total number of the first plurality of bit numbers to be smaller than the upper limit of the total bit number.

7. The bit allocation device according to claim 1, wherein when a total number of the first plurality of bit numbers is smaller than the upper limit of the total bit number, the control circuit increases a plurality of modulation levels of the plurality of subcarriers to cause the total number to be greater than the upper limit of the total bit number.

8. The bit allocation device according to claim 1, wherein when a total number of the first plurality of bit numbers is greater than the upper limit of the total bit number, the control circuit decreases a plurality of modulation levels of the plurality of subcarriers to cause the total number to be smaller than the upper limit of the total bit number.

9. The bit allocation device according to claim 1, wherein an average BER corresponding to the second plurality of bit numbers is smaller than the target BER.

10. A bit allocation method, comprising:
performing a channel estimation by a channel estimation unit to generate a plurality of channel qualities of a plurality of subcarriers;
generating a first plurality of bit numbers of the plurality of subcarriers according to the plurality of channel qualities by a processing unit; and
generating a second plurality of bit numbers of the plurality of subcarriers according to the first plurality of bit numbers and an upper limit of a total bit number by a control unit,
wherein the step of generating the second plurality of bit numbers of the plurality of subcarriers according to the first plurality of bit numbers and the upper limit of the total bit number by the control unit comprises:
generating a plurality of bit error rate (BER) differences according to a first plurality of BERs of the first plurality of bit numbers and a target BER; and
generating the second plurality of bit numbers according to the first plurality of bit numbers, the plurality of BER differences and the upper limit of the total bit number.

11. The bit allocation method according to claim 10, further comprising:
generating the first plurality of bit numbers according to the plurality of channel qualities and a target bit error rate (BER) by the processing unit.

12. The bit allocation method according to claim 10, wherein the step of generating the second plurality of bit numbers according to the first plurality of bit numbers, the plurality of BER differences and the upper limit of the total bit number comprises:
when a total number of the first plurality of bit numbers is greater than the upper limit of the total bit number, sequentially decreasing a set of bit numbers of a first set of subcarriers of the plurality of subcarriers according to a decreasing order of the plurality of BER differences and the upper limit of the total bit number to generate the second plurality of bit numbers.

13. The bit allocation method according to claim 12, wherein the step of generating the second plurality of bit numbers according to the first plurality of bit numbers, the plurality of BER differences and the upper limit of the total bit number comprises:
when the total number of the first plurality of bit numbers is smaller than the upper limit of the total bit number, increasing a set of bit numbers of a second set of subcarriers of the plurality of subcarriers to cause the total number of the first plurality of bit numbers to be greater than the upper limit of the total bit number.

14. The bit allocation method according to claim 10, wherein the step of generating the second plurality of bit numbers according to the first plurality of bit numbers, the plurality of BER differences and the upper limit of the total bit number comprises:
when a total number of the first plurality of bit numbers is smaller than the upper limit of the total bit number, sequentially increasing a set of bit numbers of a first set of subcarriers of the plurality of subcarriers according to an increasing order of the plurality of BER differences and the upper limit of the total bit number to generate the second plurality of bit numbers.

15. The bit allocation method according to claim 14, wherein the step of generating the second plurality of bit numbers according to the first plurality of bit numbers, the plurality of BER differences and the upper limit of the total bit number comprises:
when the total number of the first plurality of bit numbers is greater than the upper limit of the total bit number, decreasing a set of bit numbers of a second set of subcarriers of the plurality of subcarriers to cause the total number of the first plurality of bit numbers to be smaller than the upper limit of the total bit number.

16. The bit allocation method according to claim 10, wherein when a total number of the first plurality of bit numbers is smaller than the upper limit of the total bit number, increasing a plurality of modulation levels of the plurality of subcarriers by the control unit to cause the total number to be greater than the upper limit of the total bit number.

17. The bit allocation method according to claim 10, wherein when a total number of the first plurality of bit numbers is greater than the upper limit of the total bit number, decreasing a plurality of modulation levels of the plurality of subcarriers by the control unit to cause the total number to be smaller than the upper limit of the total bit number.

18. The bit allocation method according to claim 10, wherein an average BER corresponding to the second plurality of bit numbers is smaller than the target BER.

* * * * *